3,141,019
1,2,4-OXADIAZOLES AND PROCESSES FOR
PRODUCING THE SAME
Giuseppe Palazzo and Bruno Silvestrini, Rome, Italy, assignors to Angelini Francesco, Aziende Chimiche Riunite, Rome, Italy
No Drawing. Filed Sept. 15, 1960, Ser. No. 56,097
Claims priority, application Austria Sept. 29, 1959
10 Claims. (Cl. 260—247.5)

The present invention relates to 1,2,4-oxadiazoles and improved processes for producing the same. More specifically the present invention relates to a group of novel and therapeutically important 1,2,4-oxadiazoles of the general Formula I

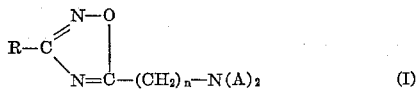   (I)

wherein R represents a member of the class consisting of aryl, aralkyl, substituted aryl, substituted aralkyl and heterocyclic radicals, $n$ is an integer from 1 to 4 and $(A)_2$ represents a number of the class consisting of hydrogen, alkyl radicals, alkylene radicals, oxaalkylene radicals and azaalkylene radicals which may form together a ring. According to the present invention, these compounds may be obtained by reaction of amidoxime derivatives represented by the following general formula:

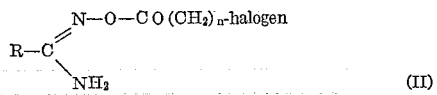   (II)

wherein R and $n$ have the above-mentioned signification, with amines represented by the formula $HN(A)_2$ wherein $(A)_2$ has the above-mentioned signification, and subsequent isolation of the oxadiazoles.

According to one embodiment of the present invention amidoxime derivatives represented by the general formula

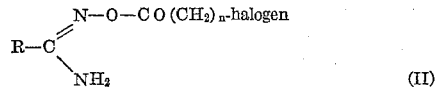   (II)

wherein R and $n$ have the above-mentioned signification are transformed under the influence of heat into the corresponding oxidiazoles represented by the formula

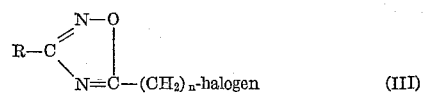   (III)

which oxadiazoles subsequently are aminated with amines of the formula $$HN(A)_2 \quad (IV)$$

to yield oxadiazoles of the Formula I.

A further embodiment of the present invention comprises the steps of reacting an amidoxime $$R.C(=NH).NH.OH$$

(R having the above-mentioned signification) with a dialkylamino-carboxylic acid chloride or hydrohalide thereof represented by the general formula $$Cl.CO.(CH_2)_n.N(A)_2$$

wherein $n$ and $(A)_2$ have the above-mentioned signification, to yield oxadiazoles according to Formula I.

Particularly suitable amidoxime derivatives are those wherein R e.g., is a phenyl, chlorophenyl, nitrophenyl, hydroxyphenyl, tolyl, methoxyphenyl, naphthyl, tetrahydronaphthyl, diphenyl, pyridyl, benzyl, α-phenylpropyl. Suitable amines are those wherein $(A)_2$ may be $H_2$, $(CH_3)_2$, $(C_2H_5)_2$, $(C_3H_7)_2$,

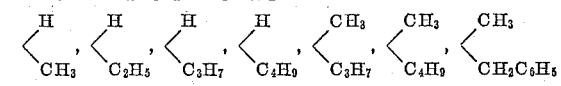

or together with the nitrogen atom may form one of following rings:

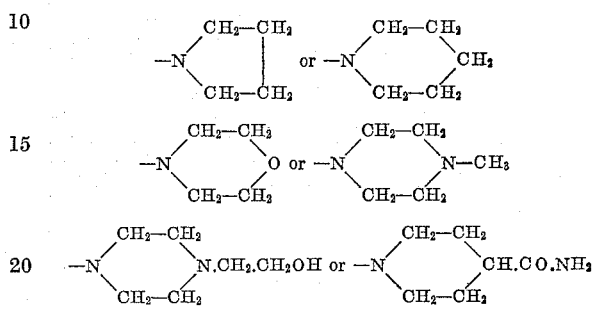

The amidoxime derivatives serving as starting materials preferably are produced by reacting an amidoxime $R.C(=N.OH).NH_2$ at low temperatures in presence of an inert solvent with an ω-halogen-carboxylic acid halide containing from 2 to 5 carbon atoms.

The compounds obtained according to the process of the present invention show very interesting pharmacological characteristics which may be summarized as follows:

(1) An unspecific, antispasmodic effect in vitro on the smooth muscles of the small gut of the guinea-pig after stimulation by means of acetylcholine, histamine, barium chloride and 1,1-dimethyl-4-phenyl-piperazinium iodide. Some compounds, such as 3-p-chlorophenyl-5-pyrrolidinopropyl 1,2,4-oxadiazole, 3-p-chlorophenyl-5-diethylaminoethyl 1,2,4-oxadiazole and 3-tetrahydronaphthyl-5-dimethylaminomethyl 1,2,4-oxadiazole exhibit an activity equal or even superior to the activity of papaverine.

(2) A coronary-extending effect on the isolated rat heart. Some compounds, such as 3-α-naphthyl-5-pyrrolidinopropyl 1,2,4-oxadiazole show an effect as high as papaverine.

(3) A local anesthetic effect on the cornea of the rabbit. The corneal reflex by numerous compounds in a concentration of 0.5% is annulled completely. Examples of such compounds are 3-p-chlorphenyl-5-morpholinopropyl 1,2,4-oxadiazole.

(4) A sedative and convulsive effect on the mouse in doses being far below the toxic level.

(5) An antitussive effect. 3-phenyl-5-dimethylaminoethyl 1,2,4-oxadiazole and N-(3-o-chlorphenyl-1,2,4-oxadiazolyl - (5) - propyl)-N'-β-hydroxyethylpiperazine prevent the cough caused in guinea-pigs by stimulants in the same degree or even better than codein. They also prevent the cough of the cat whose nervus laryngeus superior has been stimulated electrically.

(6) A tone reducing effect. 3-p-tolyl-5-diethylaminoethyl 1,2,4-oxadiazole exhibits for inst. in intravenous doses of 5 mg./kg. of body weight a lasting effect when recording the arterial pressure of the narcotized cat.

(7) An analgetic and antiinflammatory effect. With the rat test according to Randall and Selitto (Archives Internationales de Pharmacodynamie et de Thérapie 111, 409–419; 1957) some compounds as for inst. 3-p-methoxyphenyl-5-diethylaminoethyl-1,2,4-oxadiazole, 3 - phenyl-5-diethylaminomethyl 1,2,4-oxadiazole, N-(3-o-chlorphenyl-1,2,4-oxadiazolyl - (5) - propyl)-N'-β-hydroxyethylpiperazine and 3-phenyl-5-(N-methyl-N-butyl-aminomethyl)-1,2,4-oxadiazole have an analogous or even better effect than codein.

(8) A ganglioplegic action. In tests with an isolated guinea-pig intestine stimulated by 1,1-dimethyl-4-phenyl-piperazinium iodide as well as in vivo in the nictitating membrane test of cat the following compounds were found to be active: 3-o-chlorphenyl-5-diethylaminopropyl 1,2,4-oxadiazole and 3-o-chlorphenyl-5-pyrrolidinopropyl 1,2,4-oxadiazole.

A known compound similar to the compounds of the present invention is a 5-amino-3-phenyl-1,2,4-oxadiazole (cf. e.g. Ponzio, Gazz. Chim. Ital. 62, 854 (1932)), which in the above pharmacological tests proved to be active.

The substances according to the invention are prepared by starting with amidoximes some of which are already known but some of which are not yet described, and reacting them by three possible general procedures which are represented in the following schemata I, II and III.

(I) The amidoxime is reacted at low temperatures in an inert solvent in presence of an acid acceptor as for inst. $K_2CO_3$ or pyridine with a chlorocarboxylic acid chloride to yield a N-chloracylamidoxime in the following way:

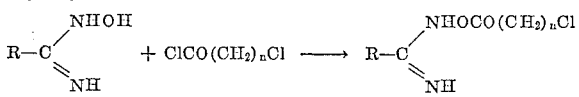

The chloracyl-amidoxime thus obtained is transferred into the corresponding 5-chloralkyl 1,2,4-oxadiazole by steam-distillation, by boiling in aqueous suspension or in an inert solvent or by heating at reduced pressure above the melting point:

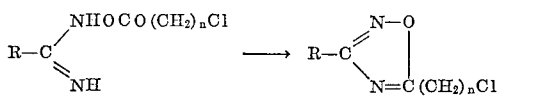

By reaction of the 5-chloralkyl 1,2,4-oxadiazoles thus produced with an appropriate primary or secondary amine the desired basic oxadiazole is obtained:

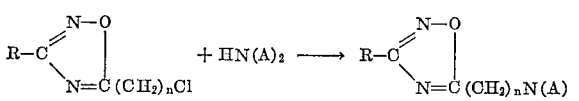

(II) The chloracylamidoxime produced according to procedure I is transformed directly into the basic oxadiazole by treatment with an appropriate amine. This step may be carried through in an inert solvent in a sealed tube; however, in some cases heating to ebullition while gradually removing the water formed and adding further solvent to the reaction vessel in order to keep a constant volume may be preferred.

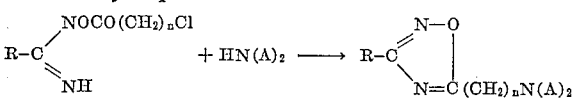

(III) The amidoxime may be reacted directly with a dialkylaminocarboxylic acid chloride. As this last mentioned substance usually is obtainable in the form of its hydrochloride it is preferable to use the hydrochloride in chloroform solution.

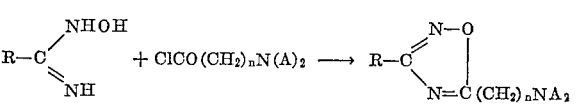

The amino-oxadiazoles of the present invention generally are liquids and only in some cases solids of low melting points. All compounds form crystalline hydrochlorides which are soluble in water and which generally may be used for pharmacological tests. Sometimes the use of citrates, maleates or tartrates may be preferable; these salts are easily produced by reacting the bases in an appropriate solvent (ethyl acetate, acetone, alcohol, etc.) with the corresponding acid. Moreover, the amino-oxadiazoles may be characterized as picrates or iodomethylates.

In the following are given some examples of the production of the new 1,2,4-oxadiazoles.

EXAMPLE 1

20 g. of benzamidoxime and 10.2 g. of anhydrous potassium carbonate are suspended in 210 g. of chloroform. To this mixture, under continuous stirring and controlling of the reaction temperature to remain beyond 15° C., there are slowly added 18.7 g. of β-chloropropionyl chloride. After addition of the acid chloride, stirring is continued for a further hour. Then with cooling there are added portionwise some ml. of water. Further amounts of water (100 ml.) are introduced into the reaction mixture and the chloroform solution containing the β-chloropropionyl benzamidoxime is separated.

To this solution there is added in about 20 minutes a solution of 26.2 ml. of diethylamine in 26 ml. $CHCl_3$ while providing the temperature not to exceed 35° C. The reacting mixture is heated to boiling, water formed during the reaction being distilled off thereby. After 2 hours the distillate contains no more water and the reaction is finished. Water is added to dissolve diethylamine hydrochloride formed during the reaction, and the chloroform layer containing the 3-phenyl-5-β-diethyl-aminoethyl 1,2,4-oxadiazole is separated from the aqueous layer. The product may be purified by distillation under reduced pressure (B.P. 130°/0.5 mm.) or by conversion into its hydrochloride. The yield amounted to 80% (referred to benzamidoxime).

*Analysis.*—Found: C, 68.23%; H, 7.97%; N, 17.10%. Calc.: C, 68.54%; H, 7.81%; N, 17.13%.

The hydrochloride has a M.P. of 153–154° C. Melting points of further salts:

| | ° C. |
|---|---|
| Citrate | 141–142 |
| Maleate | 103–104 |
| Tartrate | 114–115 |
| Iodomethylate | 112–114 |

EXAMPLE 2

To a solution of 40 g. of benzamidoxime in 450 ml. of anhydrous ether there is added dropwise and with stirring and external cooling a solution of 18.7 g. of β-chloropropionyl chloride in 50 ml. of anhydrous ether. A thick precipitate is obtained and the mixture is stirred for further 30 minutes and then is filtered. The precipitate is washed with water to remove benzamidoxime chlorhydrate, the β-chloropropionyl benzamidoxime remaining undissolved. This product after drying over $P_2O_5$ is obtained in 94% yield, M.P. 98–99° C.

A solution of 9.2 g. of diethylamine in 50 ml. of anhydrous benzene is added dropwise with stirring and cooling to a suspension of 13 g. of β-chloropropionyl benzamidoxime in 50 ml. of anhydrous benzene. After heating the reaction mixture for two hours it is cooled and washed twice with 10 ml. of water. After drying with $CaCl_2$ the solvent is distilled off. There were obtained 10.5 g. of 3-phenyl-5-β-diethylaminoethyl 1,2,4-oxadiazole, B.P. 127°/0.4 mm.

EXAMPLE 3

10 ml. of β-chloropropionylchloride are added all at once to 10 g. of benzamidoxime at a temperature of 120° C. from the top of a reflux condenser. The mixture is extracted several times with water and petroleum ether, whereupon the petroleum ether layer is dried and distilled. At 110° C. (.2 mm.) a fraction consisting of 3-phenyl-5β-chlorethyl-1,2,4-oxadiazole is obtained .05 mole of this compound are dissolved in 150 ml. toluene and heated with .1 mole of diethylamine for two hours. Thereupon the precipitate consisting of diethylamine hydrochloride is filtered. The filtrate is treated with diluted HCl, made alkaline with $K_2CO_3$ and extracted with ether. The hydrochloride of 3-phenyl-5-β-diethylamino-ethyl-1, 2,4-oxadiazole is precipitated with ethereal HCl. After recrystallization from absolute alcohol the product has a melting point of 153–154° C.

EXAMPLE 4

0.1 mole of benzamidoxime are suspended in 200 ml. of anhydrous ether. While stirring vigorously and cooling with ice a solution of .05 mole of γ-chlorobutyryl-chloride in 20 ml. of ether is added. The mixture is stirred for half an hour at room temperature and the thick precipitate is filtered. This precipitate is washed several times with water for removing the hydrochloride of benzamidoxime and then is dried in a vacuum exsiccator over $P_2O_5$. Yield 92%. Melting point 106–107° C.

10 g. of γ-chlorobutyl-benzamidoxime and 9.1 g. of diethylamine in 40 ml. of toluene are heated for 16 hours at 130° C. in a sealed tube. The whole contents of the tube is acidified with diluted hydrochloric acid and subsequently the aqueous solution is treated with solid $K_2CO_3$. The oil which separates is extracted with ether and dried with $Na_2SO_4$. After removal of the solvent the product is distilled at reduced pressure. The 3-phenyl-5-γ-diethylaminopropyl-1,2,4-oxadiazole boils at 136° C./.1 mm. Yield 7.3 g.

EXAMPLE 5

0.12 mole of δ-bromovaleryl chloride are dissolved in 30 ml. of acetone. A stirred mixture of 0.12 mole of benzamidoxime, 0.062 mole of potassium carbonate and 100 ml. of acetone is slowly added. The resulting precipitate is filtered and washed with water. There is obtained δ-bromovalerylbenzamidoxime in 90% yield. After recrystallization from alcohol it has a melting point of 106–108° C.

0.09 mole of diethylamine and 0.04 mole of the bromovalerylbenzamidoxime are dissolved in 70 ml. xylene. The solution is heated for two hours in a flask provided with a condenser for removal of the water being formed during the reaction. Then the reaction mixture is cooled and treated with diluted hydrochloric acid; the aqueous layer is made alkaline and extracted with ether. The ethereal extracts are dried over anhydrous sodium sulphate, whereupon the solvent is removed. There is obtained 3-phenyl-5-δ-diethylaminobutyl-1,2,4-oxadiazole, B.P.=145° C./0.4 mm. Yield 55%. The hydrochloride has a melting point of 117–118° C.

EXAMPLE 6

0.05 mole of δ-chlorobutyrylchloride are dissolved in 20 ml. of anhydrous ether; this solution is added dropwise to a suspension containing 0.1 mole of benzamidoxime in 300 ml. of anhydrous ether while stirring and cooling the mixture. After the addition has been finished stirring is contained for another 30 minutes. Then, it is filtered and the precipitate is washed with water. The γ-chlorobutyryl benzamidoxime having a melting point of 106–107° C. is obtained in nearly theoretical amount.

The γ-chlorobutyrylbenzamidoxime is heated for a few minutes to 130–140° C. It may also be boiled in water for 3–4 hours. It is extracted with ether, dried with $Na_2SO_4$ and the solvent is distilled off. The resulting 3-phenyl-5-γ-chloropropyl-1,2,4-oxadiazole has a boiling point of 136° C./0.1 mm. Yield: 85%. 9 g. of 3-phenyl-5-γ-chloropropyl-1,2,4-oxadiazole and 14.6 g. of diethylamine in 70 ml. of xylene are heated in a sealed tube for 30 hours at 130° C. The whole contents of the tube are treated with 2 n HCl and the aqueous layer is made alkaline with NaOH. An oil separates which is extracted by means of ether. One dries with $Na_2SO_4$, removes the solvent and distills at reduced pressure. The 3-phenyl-5-γ-diethylaminopropyl-1,2,4-oxadiazole is obtained in a yield of 76% and has a boiling point of 136° C./0.1 mm.

EXAMPLE 7

A solution of 0.1 mole of γ-chlorobutyrylchloride in 30 ml. of anhydrous acetone is added dropwise to a stirred and cooled solution containing 0.1 mole of α-naphthamidoxime and 0.05 mole of anhydrous potassium carbonate in 100 ml. of anhydrous acetone. After the addition stirring is continued for another half an hour and the copious precipitate is filtered. Then the acetone solution is evaporated under reduced pressure; an oil is remaining which solidifies by treatment with water. This residue and the precipitate are combined. After washing with water γ-chlorobutyryl-α-napthamidoxime which melts at 124–125° C. is obtained in nearly theoretical yield.

After heating of the γ-chlorobutyryl-α-naphthamidoxime for half an hour at 130° C. and under reduced pressure the α-napthyl-γ-chloropropyl-oxadiazole is obtained in a yield of 90%. The substance has a boiling point of 190° C./0.5 mm. and solidifies in the collector. Melting point: 41–43° C.

8.8 g. 3α-naphthyl-5-γ-chloropropyl-1,2,4-oxadiazole and 5.7 g. pyrrolidine are heated in 60 ml. of anhydrous toluene in a sealed tube for 15 hours at 120° C. The mixture is washed in some ml. of water in order to remove pyrrolidine hydrochloride, then it is dried and distilled under reduced pressure. The product boils at 181° C./0.5 mm. Yield: 8.6 g. By treatment with the calculated amount of alcoholic hydrochloric acid the hydrochloride melting at 116–117° C. is obtained.

EXAMPLE 8

0.15 mole of chloracetyl chloride are dissolved in 10 ml. of anhydrous ether, whereupon this solution is added dropwise to 0.3 mole of p-chlorobenzamidoxime which is suspended in 70 ml. of anhydrous ether. The mixture is continuously stirred and cooled with ice. A white precipitate is formed increasing towards the end of the addition. Stirring is continued for another hour whereafter the reaction mixture is filtered. The precipitate is carefully washed with water to remove the p-chlorobenzamidoxime hydrochloride, and the product is dried in a vacuum exsiccator over $P_2O_5$. The yield is nearly theoretical. The chloracetyl-p-chlorobenzamidoxime thus obtained and having the formula

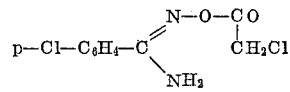

is heated for some time to 130° C. or, still better is treated for several hours on the steam bath. Thus 3-p-chlorophenyl-5-chloromethyl-1,2,4-oxadiazole melting at 58–60° C. is obtained in 90% yield. M.P. after recrystallization from ethanol: 60–61° C.

A benzene solution comprising 0.1 mole of pyrrolidine is added at room temperature with stirring to a benzene solution containing 0.05 mole of 3-p-chlorophenyl-5-chloromethyl-1,2,4-oxadiazole. After the addition is complete the mixture is heated on the water bath for an hour. 10% NaOH is added, the benzene layer separated and dried with $Na_2SO_4$. After removal of the solvent there is obtained 3-p-chlorophenyl - 5 - pyrrolidinomethyl-1,2,4-oxadiazole, B.P. 141° C./3 mm. which solidifies in the receiver. Melting point 42–44° C. Yield 87%.

EXAMPLE 9

A solution of 15 g. of the hydrochloride of diethylamino acetic acid chloride in 75 ml. of chloroform is added to a solution of 27.5 g. of benzamidoxime in chloroform. The mixture is heated for four hours while removing the water formed during the reaction and maintaining the volume of the liquid in the reaction flask by adding further chloroform. Thereupon it is cooled and extracted with diluted hydrochloric acid. The aqueous layer is washed with ether and afterwards made alkaline with a solution of NaOH. Then it is extracted with ether, the etheral solution is washed and dried with anhydrous sodium sulphate. After removal of the solvent the product is distilled at reduced pressure thus obtaining a substance boiling at 0.1 mm. and 115–120° C. The 3-phenyl-5-diethylaminomethyl-1,2,4-oxadiazole thus obtained is purified by conversion into the hydrochloride and by recrystallization from absolute alcohol. Melting point 166–168° C., yield 35%.

Further examples of compounds which were produced according to the present invention are given in the following table:

*General Formula A*

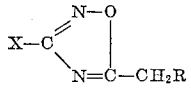

(1) $X=C_6H_5-$; $R=NH_2$, M.P. 49° C.; $C_9H_9N_3O-$Found: N, 24.28%. Calc.: N, 23.99%.

(2) $X=C_6H_5-$; $R=NHCH_3$, B.P.$_{0.6}$ 120° C.;

$C_{10}H_{12}ClN_3O$ (hydrochl.)—Found: Cl ion, 15.82%. Calc.: Cl. ion, 15.71%.

(3) $X=C_6H_5-$; $R=NHC_2H_5$, B.P.$_{.3}$ 149° C.; M.P. hydrochloride, 200–2° C.; $C_{11}H_{14}ClN_3O$ (hydrochl.)—Found: Cl ion, 14.76%. Calc.: Cl ion, 14.79%.

(4) $X=C_6H_5-$; $R=N(CH_3)_2$, B.P.$_{0.2}$ 121° C.; M.P. hydrochl., 228–30° C.; $C_{11}H_{14}ClN_3O$ (hydrochl.)—Found: Cl ion, 14.79%. Calc.: Cl ion, 14.79%.

(5) $X=C_6H_5-$; $R=NHC_3H_7$, B.P.$_{0.6}$ 126° C.; M.P. hydrochl., 181° C., $C_{12}H_{16}ClN_3O$—Found: Cl ion, 14.05%. Calc.: Cl ion, 13.97%.

(6) $X=C_6H_5-$; $R=NHiC_3H_7$, B.P.$_{1.5}$ 138° C.; M.P. hydrochloride, 201–2° C.; $C_{12}H_{16}ClN_3O$ (hydrochl.)—Found: Cl ion, 14.00%. Calc.: Cl ion, 13.97%.

(7) $X=C_6H_5-$;

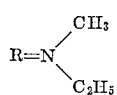

B.P.$_{0.6}$ 114° C.; M.P. hydrochloride, 173–4° C.; $C_{12}H_{16}ClN_3O$ (hydrochl.)—Found: Cl ion, 13.99%. Calc.: Cl ion, 13.97%.

(8) $X=C_6H_5-$; $R=N(C_2H_5)_2$, B.P.$_{0.05}$ 115° C.; M.P. hydrochloride, 166–8° C.; $C_{13}H_{18}ClN_3O$ (hydrochl.)—Found: Cl ion, 13.15%. Calc.: Cl ion, 13.24%.

(9) $X=C_6H_5-$; $R=NHC_4H_9$, B.P.$_{.1}$ 142–3° C.; M.P. hydrochloride, 195–6° C.; $C_{13}H_{18}ClN_3O$ (hydrochl.)—Found: Cl ion, 13.24%. Calc.: Cl ion, 13.24%.

(10) $X=C_6H_5-$; $R=NHiC_4H_9$, B.P.$_{0.1}$ 122° C.; M.P. hydrochloride, 193° C.; $C_{13}H_{18}ClN_3O$—Found: Cl ion, 13.26%. Calc.: Cl ion, 13.24%.

(11) $X=C_6H_5-$;

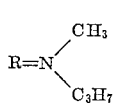

B.P.$_{0.5}$ 127° C.; M.P. hydrochloride, 128° C.; $C_{13}H_{18}ClN_3O$—Found: Cl ion, 13.27%. Calc.: Cl ion, 13.24%.

(12) $X=C_6H_5-$;

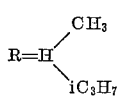

B.P.$_{0.3}$ 114° C.; M.P. hydrochloride, 192–3° C.; $C_{13}H_{18}ClN_3O$ (hydrochl.)—Found: Cl ion, 13.12%. Calc.: Cl ion, 13.24%.

(13) $X=C_6H_5-$;

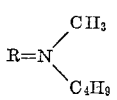

B.P.$_{0.2}$ 121° C.; M.P. hydrochloride, 139–40° C.; $C_{14}H_{20}ClN_3$ (hydrochl.)—Found: Cl ion, 12.55%. Calc.: Cl ion, 12.58%.

(14) $X=C_6H_5-$;

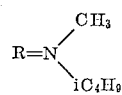

B.P.$_{0.2}$ 117° C.; M.P. hydrochloride, 165° C.; $C_{14}H_{20}ClN_3O$—Found: Cl ion, 12.73%. Calc.: Cl ion, 12.58%.

(15) $X=C_6H_5-$; $R=N(C_3H_7)_2$, B.P.$_{0.2}$ 126° C.; M.P. hydrochloride, 171–2° C.; $C_{15}H_{22}ClN_3O$ (hydrochl.)—Found: Cl ion, 12.01%. Calc.: Cl ion, 11.99%.

(16) $X=C_6H_5-$;

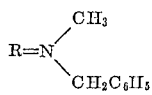

B.P.$_{0.3}$ 173° C.; M.P. hydrochloride, 165° C.; $C_{17}H_{18}ClN_3O$ (hydrochl.)—Found: Cl ion, 11.24%. Calc.: Cl ion, 11.23%.

(17) $X=C_6H_5-$;

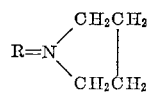

B.P.$_{0.1}$ 128° C.; M.P. hydrochloride, 201–3° C.; $C_{13}H_{16}ClN_3O$ (hydrochl.)—Found. Cl ion, 12.49%. Calc.: Cl ion, 12.58%.

(18) $X=C_6H_5-$;

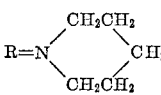

B.P.$_{0.7}$ 153° C.; M.P. hydrochloride, 248–9° C.; $C_{14}H_{18}ClN_3O$ (hydrochl.)—Found: Cl ion, 12.70%. Calc.: Cl ion, 12.68%.

(19) $X=C_6H_5-$;

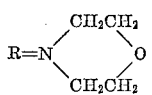

B.P.$_{0.1}$ 160° C.; M.P. dihydrochloride, 213–5° C.; $C_{13}H_{16}ClN_3O_2$ (dihydrochl.) — Found: Cl ion, 12.61%. Calc.: Cl ion, 12.58%.

(20) $X=C_6H_5-$;

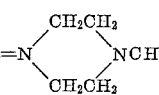

B.P.$_{0.3}$ 155° C.; M.P. dihydrochloride, 238–40° C.; $C_{14}H_{20}Cl_2N_4O$ (dihydrochl.)—Found: Cl ion, 21.46%. Calc.: Cl ion, 21.41%.

(21) $X=C_6H_5-$;

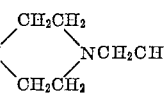

M.P. dihydrochloride, 244–5° C.; $C_{15}H_{22}Cl_2N_4O_2$(dihydrochl.)—Found: Cl ion, 19.39%. Calc.: Cl ion, 19.63%.

(22) $X=C_6H_5-$; $R=N(CH_3)_3Cl$, M.P. 187° C.;

$C_{12}H_{16}ClN_3O-$

Found: Cl ion, 13.74%. Calc.: Cl ion, 13.94%.

(23) $X=o.ClC_6H_4-$; $R=N(C_2H_5)_2$, B.P.$_{0.8}$ 144° C.; M.P. hydrochloride, 152° C.; $C_{13}H_{17}Cl_2N_3O$ (hydrochl.)—Found: Cl ion, 23.15%. Calc.: Cl ion, 23.47%.

(24) $X=o.ClC_6H_4-$;

M.P. dihydrochl., 208–10° C.; $C_{15}H_{21}Cl_3N_4O$ (dihydrochl.)—Found: Cl ion, 18.04%. Calc.: Cl ion, 17.92%.

(25) X=m.ClC$_6$H$_4$—; R=N(C$_2$H$_5$)$_2$, B.P.$_{0.4}$ 132° C.; M.P. hydrochl., 213–4° C.; $C_{13}H_{17}Cl_2N_3O$—Found: Cl ion, 11.76%. Calc. Cl ion, 11.73%.

(26) X=p.ClC$_6$H$_4$—; R=N(C$_2$H$_5$)$_2$, B.P.$_{0.3}$ 137° C.; M.P. hydrochl., 180° C.; $C_{13}H_{17}Cl_2N_3O$ (hydrochl.)—Found: Cl ion, 11.81%. Calc.: Cl ion, 11.73%.

(27) X=p.ClC$_6$H$_4$—;

$$R=N\begin{matrix}CH_2CH_2\\ \\CH_2CH_2\end{matrix}$$

B.P.$_{0.3}$ 141° C.; M.P. 42–4° C.; M.P. hydrochloride, 235–6° C.; $C_{13}H_{15}Cl_2N_3O$ (hydrochl.)—Found: Cl ion, 11.85%. Calc.: Cl ion, 11.81%.

(28) X=o.BrC$_5$H$_4$—; R=N(C$_2$H$_5$)$_2$, B.P.$_{0.3}$ 142° C.; M.P. hydrochl., 171° C.; $C_{13}H_{17}BrClN_3O$—Found: Cl ion, 10.12%. Calc.: Cl ion, 10.23%.

(29) X=o.BrC$_6$H$_4$—;

$$R=N\begin{matrix}CH_2CH_2\\ \phantom{X}CH\\CH_2CH_2\end{matrix}$$

B.P.$_{0.4}$ 173° C.; M.P. hydrochl., 200–1° C.;

$$C_{14}H_{17}BrClN_3O—$$

Found: Cl ion, 10.04%. Calcl.: Cl ion, 9.88%.

(30) X=p.CH$_3$C$_6$H$_4$—; R=N(C$_2$H$_5$)$_2$, B.P.$_1$ 135° C.; M.P. hydrochl., 161° C.; $C_{14}H_{20}ClN_3O$ (hydrochl.)—Found: Cl ion, 12.65%. Calc. Cl ion, 12.59%.

(31) X=p.CH$_3$OC$_6$H$_4$—; R=N(C$_2$H$_5$)$_2$, B.P.$_{0.3}$ 140° C.; M.P. hydrochl., 173° C.; $C_{14}H_{19}N_3O_2$—Found: C, 64.09%; H, 7.25%. Calc.: C, 64.34%; H, 7.33%.

(32) X=p.CH$_3$OC$_6$H$_4$—;

$$R=N\begin{matrix}CH_3\\ \\iC_3H_7\end{matrix}$$

B.P.$_2$ 170° C.; M.P. hydrochl., 188–9° C.;

$$C_{14}H_{20}ClN_3O_2$$

(hydrochl.)—Found: Cl ion, 12.18%. Calc.: Cl ion, 11.91%.

(33) X=p.CH$_3$OC$_6$H$_4$—;

$$R=N\begin{matrix}CH_3\\ \\C_4H_9\end{matrix}$$

B.P.$_{0.5}$ 157° C.; M.P. hydrochl., 143–4° C.;

$$C_{15}H_{22}ClN_3O_2$$

(hydrochl.)—Found: Cl ion, 11.34%. Calc.: Cl ion, 11.37%.

(34) X=p.CH$_3$OC$_6$H$_4$—;

$$R=N\begin{matrix}CH_2CH_2\\ \phantom{XX}O\\CH_2CH_2\end{matrix}$$

M.P. 80–1° C.; M.P. hydrochl., 224–6° C.;

$$C_{14}H_{17}N_3O_3—$$

Found: C, 60.87%; H, 6.14%. Calc. C, 61.08%; H, 6.22%.

(35) X=p.CH$_3$OC$_6$H$_4$—;

$$R=N\begin{matrix}CH_2CH_2\\ \phantom{XX}NCH_2CH_2OH\\CH_2CH_2\end{matrix}$$

M.P. dihydrochl., 225–7° C.; $C_{16}H_{24}Cl_2N_4O_3$ (dihydrochl.)—Found: Cl ion, 18.30%. Calc.: Cl ion, 18.12%.

(36) X=p.NO$_2$C$_6$H$_4$—; R=N(C$_2$H$_5$)$_2$, M.P. 68–9° C.; M.P. hydrochl., 212° C.; $C_{13}H_{17}ClN_4O_3$ (hydrochl.)—Found: Cl ion, 11.60%. Calc.: Cl ion, 11.34%.

(37) X=p.NO$_2$C$_6$H$_4$—;

$$R=C\begin{matrix}CH_2CH_2\\ \phantom{XX}O\\CH_2CH_2\end{matrix}$$

M.P. 143° C.; $C_{13}H_{14}N_4O_4$—Found: N, 19.15%. Calc.: N, 19.30%.

(38) X=o.OHC$_6$H$_4$—; R=N(C$_2$H$_5$)$_2$, M.P. hydrochl., 184° C.; $C_{13}H_{18}ClN_3O_2$ (hydrochl.)—Found Cl ion, 12.52%. Calc.: Cl ion, 12.50%.

(39) X=3.4(CH$_3$O)$_2$C$_6$H$_3$—; R=N(C$_2$H$_5$)$_2$, B.P.$_{1.5}$ 187° C.; M.P. hydrochl., 202–3° C.; $C_{15}H_{22}ClN_3O_3$ (hydrochl.)—Found: Cl ion, 11.07%. Calc.: Cl ion, 10.82%.

(40) X=3.4 (CH$_3$O)$_2$C$_6$H$_3$—;

$$R=N\begin{matrix}CH_2CH_2\\ \phantom{XX}CH\\CH_2CH_2\end{matrix}$$

M.P. hydrochl., 235–6° C.; $C_{15}H_{20}ClN_3O_3$ (hydrochl.)—Found: Cl ion, 10.94%. Calc.: Cl ion, 10.88%.

(41) X=3.4.5(CH$_3$O)$_3$C$_6$H$_2$—; R=N(C$_2$H$_5$)$_2$, M.P. hydrochl., 175° C.; $C_{16}H_{24}ClN_3O_4$ (hydrochl.)—Found: Cl ion, 9.85%. Calc.: Cl ion, 9.91%.

(42) X=3.4.5(CH$_3$O)$_3$C$_6$H$_2$—;

$$R=N\begin{matrix}CH_2CH_2\\ \phantom{XX}CH\\CH_2CH_2\end{matrix}$$

M.P. hydrochl., 178–9° C.; $C_{16}H_{22}ClN_3O_4$ (hydrochl.)—Found: Cl ion, 10.03%. Calc. Cl ion, 9.96%.

(43) X=C$_6$H$_5$CH$_2$—; R=N(CH$_3$)$_2$, B.P.$_{0.2}$ 110° C.; M.P. hydrochloride, 150° C.; $C_{12}H_{16}ClN_3O$ (hydrochl.).—Found: Cl ion, 14.02%. Calc.: Cl ion, 13.97%.

(44) X=C$_6$H$_5$CH$_2$—; R=N(C$_2$H$_5$)$_2$, B.P.$_1$ 132° C.; M.P. hydrochl., 115–6° C.; $C_{14}H_{20}ClN_3O$ (hydrochl.)—Found: Cl ion, 12.65%. Calc.: Cl ion, 12.58%.

(45) X=C$_6$H$_5$CH—;
$\phantom{XXXXX}|$
$\phantom{XXXX}$C$_2$H$_5$

R=N(C$_2$H$_5$)$_2$, B.P.$_{0.7}$ 132° C.; M.P. hydrochl., 101–3° C.; $C_{16}H_{24}ClN_3O$ (hydrochl.) — Found: Cl ion, 11.38%. Calc.: Cl ion, 11.44%.

(46) X=C$_6$O$_5$CH—;
$\phantom{XXXXX}|$
$\phantom{XXXX}$C$_2$H$_5$ $$R=N\begin{matrix}CH_2CH_2\\ \phantom{XX}O\\CH_2CH_2\end{matrix}$$

B.P.$_{0.6}$ 162° C.; M.P. hydrochl., 179–80° C.; $C_{16}H_{22}ClN_3O_2$ (hydrochl.)—Found: Cl ion, 11.12%. Calc. Cl ion, 10.95%.

(47) X=C$_6$H$_5$CH—;
$\phantom{XXXXX}|$
$\phantom{XXXX}$C$_2$H$_5$ $$R=N\begin{matrix}CH_2CH_2\\ \phantom{XX}NCH_2CH_2OH\\CH_2CH_2\end{matrix}$$

M.P. dihydrochl., 183–5° C.; $C_{18}H_{28}Cl_2N_4O_2$ (dihydrochl.)—Found: Cl ion, 17.88%. Calc.: Cl ion, 17.58%.

(48) X=αac.C$_{10}$H$_{11}$— (1-tetrahydronaphthyl); R=N(C$_2$H$_5$)$_2$, B.P.$_{0.1}$ 155° C.; M.P. hydrochloride, 144° C.; $C_{17}H_{24}ClN_3O$ (hydrochl.)—Found: Cl ion, 11.05%. Calc. Cl ion, 11.02%.

(49) X=αac.C$_{10}$H$_{11}$— (1-tetrahydronaphthyl);

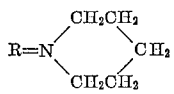

B.P.$_{0.1}$ 169° C.; M.P. hydrochl., 186° C.; C$_{18}$H$_{24}$ClN$_3$O (hydrochl.)—Found: Cl ion, 10.82%. Calc.: Cl ion, 10.62%.

(50) X=p.C$_6$H$_5$C$_6$H$_4$— (p. biphenylyl); R=N(C$_2$H$_5$)$_2$, M.P. hydrochl., 196–7° C.; C$_{19}$H$_{22}$ClN$_3$O (hydrochl.)—Found: Cl ion, 10.26%. Calc.: Cl ion, 10.31%.

(51) X=p.C$_6$H$_5$C$_6$H$_4$— (p. biphenylyl); R=NHC$_4$H$_9$, M.P. hydrochl., 226° C.; C$_{19}$H$_{22}$ClN$_3$O (hydrochl.)—Found: Cl ion, 10.53%. Calc.: Cl ion, 10.31%.

(52) X=αC$_5$H$_4$N— (α pyridyl); R=N(C$_2$H$_5$)$_2$, M.P. dihydrochloride, 190° C.; C$_{12}$H$_{18}$Cl$_2$N$_4$O (dihydrochl.)—Found: Cl ion, 23.30%. Calc.: Cl ion, 23.23%.

*General Formula B*

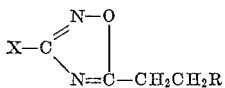

(53) X=C$_6$H$_5$—; R=N(CH$_3$)$_2$, M.P. hydrochloride, 160–1° C.; C$_{12}$H$_{16}$ClN$_3$O (hydrochl.)—Found: Cl ion, 13.97%. Calc.: Cl ion, 13.97%.

(54) X=C$_6$H$_5$—; R=N(C$_2$H$_5$)$_2$, B.P.$_{0.5}$ 130°; M.P. hydrochloride, 153–4° C.; M.P. citrate, 141–2° C.; M.P. maleate, 103–4° C.; M.P. tartrate, 114–5° C.; M.P. iodomethylate, 112–4° C.; C$_{14}$H$_{19}$N$_3$O—Found: C, 68.23%; N, 7.97%. Calc.: C, 68.54%; N, 7.81%. Found: N, 17.10%. Calc.: N, 17.13%.

(55) X=C$_6$H$_5$—;

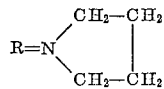

M.P. hydrochl., 173–4° C.; C$_{14}$H$_{18}$ClN$_3$O (hydrochl.)—Found: Cl ion, 12.81%. Calc.: Cl ion, 12.52%.

(56) X=C$_6$H$_5$—;

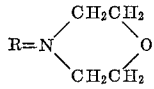

M.P. hydrochl., 190°–2° C.; C$_{14}$H$_{18}$ClN$_3$O$_2$ (hydrochl.)—Found: Cl ion, 12.25%. Calc.: Cl ion, 11.99%.

(57) X=C$_6$H$_5$—;

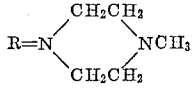

M.P. hydrochl., 194–6° C.; C$_{15}$H$_{22}$Cl$_2$N$_4$O (dihydrochl.)—Found: Cl ion, 20.50%. Calc.: Cl ion, 20.54%.

(58) X=C$_6$H$_5$—;

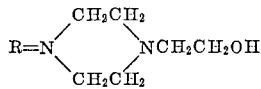

M.P. dihydrochl., 192–4° C.; C$_{16}$H$_{24}$Cl$_2$N$_4$O$_2$ (dihydrochl.)—Found: Cl ion, 19.10%. Calc.: Cl ion, 18.90%.

(59) X=m.ClC$_6$H$_4$—; R=N(C$_2$H$_5$)$_2$, M.P. hydrochloride, 131–2° C.; C$_{14}$H$_{19}$Cl$_2$N$_3$O (hydrochl.)—Found: Cl ion, 22.65%. Calc.: Cl ion, 22.43%.

(60) X=p.ClC$_6$H$_4$— R=N(C$_2$H$_5$)$_2$, M.P. hydrochl., 159–61° C.; C$_{14}$H$_{19}$Cl$_2$N$_3$O$_2$ (hydrochl.)—Found: Cl ion, 11.04%. Calc.: Cl ion, 11.21%.

(61) X=p.ClC$_6$H$_4$—;

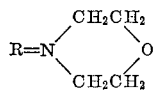

M.P. hydrochl., 158–9° C.; C$_{14}$H$_{17}$Cl$_2$N$_3$O$_2$ (hydrochl.)—Found: Cl ion, 11.07%. Calc.: Cl ion, 10.74%.

(62) X=p.CH$_3$C$_6$H$_4$—; R=N(C$_2$H$_5$)$_2$, M.P. hydrochl., 167–8° C.; C$_{15}$H$_{22}$ClN$_3$O (hydrochl.)—Found: Cl ion, 12.08%. Calc.: Cl ion, 11.99%.

(63) X=p.CH$_3$C$_6$H$_4$—;

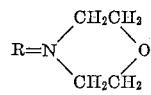

M.P. hydrochl., 200° C.; C$_{15}$H$_{20}$ClN$_3$O$_2$ (hydrochl.)—Found: Cl ion, 11.55%. Calc. Cl ion, 11.45%.

(64) X=p.CH$_3$OC$_6$H$_4$—;

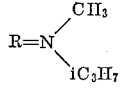

M.P. hydrochl., 162° C.; C$_{15}$H$_{22}$ClN$_3$O$_2$ (hydrochl.)—Found: Cl ion, 11.29%. Calc.: Cl ion, 11.37%.

(65) X=p.CH$_3$OC$_6$H$_4$—; R=N(C$_2$H$_5$)$_2$, B.P.$_{0.1}$ 148° C.; M.P. hydrochl., 160–1° C.; M.P. citrate, 153–4° C.; C$_{15}$H$_{22}$ClN$_3$O$_2$ (hydrochl.)—Found: Cl ion, 11.38%. Calc.: Cl ion, 11.37%.

(66) X=C$_2$H$_5$OC$_6$H$_4$—; R=N(C$_2$H$_5$)$_2$, M.P. hydrochl., 178–9° C.; C$_{16}$H$_{24}$ClN$_3$O$_2$ (hydrochl.)—Found: Cl ion, 10.92%. Calc.: Cl ion, 10.88%.

(67) X=C$_4$H$_9$OC$_6$H$_4$—; R=N(C$_2$H$_5$)$_2$, M.P. hydrochl., 163–4° C.; C$_{18}$H$_{28}$ClN$_3$O$_2$ (hydrochl.)—Found: Cl ion, 10.32%. Calc.: Cl ion, 10–31%.

(68) X=3.4(CH$_3$O)$_2$C$_6$H$_3$—; R=N(C$_2$H$_5$)$_2$, M.P. hydrochl., 179–80° C.; C$_{16}$H$_{24}$ClN$_3$O$_3$ (hydrochl.)—Found: Cl ion, 10.52%. Calc.: Cl ion, 10.37%.

(69) X=3.4.5(CH$_3$O)$_3$C$_6$H$_2$—; R=N(C$_2$H$_3$)$_2$, M.P. hydrochl., 165–6° C.; C$_{17}$H$_{26}$ClN$_3$O$_4$ (hydrochl.)—Found: Cl ion, 9.57%. Calc.: Cl ion, 9.53%.

(70) X=C$_6$H$_5$CH—;
    |
    C$_2$H$_5$

R=N(C$_2$H$_5$)$_2$, B.P.$_{0.2}$ 132° C.; M.P. nitrate, 127–8° C.; C$_{23}$H$_{33}$N$_3$O$_8$ (citrate)—Found: N, 8.80%. Calc.: N, 8.76%.

(71) X=β(C$_{10}$H$_7$)—(β naphtyl); R=N(C$_2$H$_5$)$_2$, M.P. hydrochl., 196–8° C.; C$_{18}$H$_{22}$ClN$_3$O (hydrochl.)—Found: Cl ion, 10.94%. Calc.: Cl ion, 10.69%.

(72) X=C$_6$H$_5$—C$_6$H$_4$—(p.biphenylyl); R=N(C$_2$H$_5$)$_2$, M.P. hydrochl., 206–7° C.; C$_{20}$H$_{24}$ClN$_3$O (hydrochl.)—Found: Cl ion, 9.86%. Calc.: Cl ion, 9.90%.

*General Formula C*

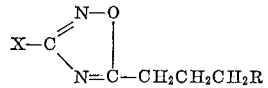

(73) X=C$_6$H$_5$—; R=N(X$_2$H$_5$)$_2$, B.P.$_{0.1}$ 136° C.; M.P. hydrochl., 130° C.; C$_{15}$H$_{21}$N$_3$O—Found: C, 69.39%; H, 8.17%. Calc.: C, 69.36%; H, 8.01%.

(74) X=C$_6$H$_5$—;

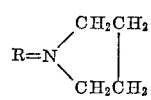

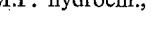

B.P.$_{0.6}$ 152° C.; M.P. hydrochl., 140–1° C.;

C$_{15}$H$_{20}$ClN$_3$O (hydrochl.)—Found: Cl ion, 11.65%. Calc.: Cl ion, 11.45%.

(75) X=C$_6$H$_5$—;

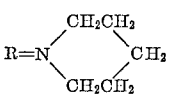

B.P.$_{0.1}$ 152° C.; M.P. hydrochl., 162° C.; C$_{16}$H$_{21}$N$_3$O—Found: C, 70.86%; H, 7.79%. Calc.: C, 70.82%; H, 7.80%.

(76) X=C$_6$H$_5$—;

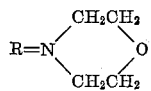

B.P.$_{0.1}$ 164° C.; M.P. hydrochl., 194° C.; C$_{15}$H$_{19}$N$_3$O$_2$—Found: C, 65.76%; H, 6.86%. Calc.: C, 65.91%; H, 7.01%.

(77) X=C$_6$H$_5$—;

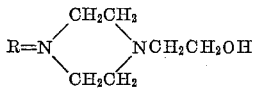

M.P. dihydrochl., 224–5° C.; C$_{17}$H$_{26}$Cl$_2$N$_4$O$_2$ (dihydrochl.)—Found: Cl ion, 18.01%. Calc.: Cl ion, 18.21%.

(78) X=C$_6$H$_5$—;

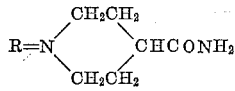

M.P. 130° C.; M.P. hydrochl., 180–1° C.;

C$_{17}$H$_{23}$ClN$_4$O$_2$ (hydrochl.)—Found: Cl ion, 10.01%. Calc.: Cl ion, 10.11%.

(79) X=o.ClC$_6$H$_4$—; R=N(C$_2$H$_5$)$_2$, B.P.$_{0.3}$ 149° C.; M.P. hydrochl., 120° C.; C$_{15}$H$_{21}$Cl$_2$N$_3$O (hydrochl.)—Found: Cl ion, 10.75%. Calc.: Cl ion, 10.74%.

(80) X=o.ClC$_6$H$_4$—;

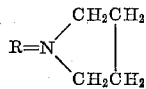

B.P.$_{0.8}$ 164° C.; M.P. hydrochl., 126–7° C.;

C$_{15}$H$_{19}$Cl$_2$N$_3$O (hydrochl.)—Found: Cl ion, 10.88%. Calc.: Cl ion, 10.80%.

(81) X=o.ClC$_6$H$_4$—;

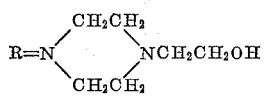

M.P. hydrochl., 152.3° C.; M.P. dihydrochl., 205–6° C.; C$_{17}$H$_{25}$Cl$_3$N$_4$O$_2$ (dihydrochl.)—Found: Cl ion, 16.42%. Calc.: Cl ion, 16.73%.

(82) X=p.ClC$_6$H$_4$—;

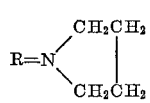

B.P.$_{0.3}$ 160° C.; M.P. hydrochl., 188–9° C.;

C$_{15}$H$_{19}$Cl$_2$N$_3$O (hydrochl.)—Found: Cl ion, 10.48%. Calc.: Cl ion, 10.80%.

(83) X=p.ClC$_6$H$_4$—; R=N(C$_2$H$_5$)$_2$, B.P.$_{0.2}$ 142° C.; M.P. hydrochl., 192° C.; C$_{15}$H$_{21}$Cl$_2$N$_3$O (hydrochl.)—Found: Cl ion, 10.91%. Calc.: Cl ion, 10.73%.

(84) X=p.ClC$_6$H$_4$—;

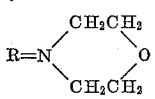

B.P.$_{0.3}$ 170° C.; M.P. hydrochl., 202–4° C.; C$_{15}$H$_{19}$Cl$_2$N$_3$O$_2$ (hydrochl.)—Found: Cl ion, 10.01%. Calc.: Cl. ion, 10.30%.

(85) X=p.ClC$_6$H$_4$—;

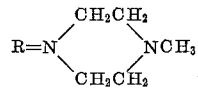

B.P.$_{0.4}$ 180° C.; M.P. 37–9° C.; M.P. dihydrochl. 252–4° C.; C$_{16}$H$_{21}$ClN$_4$O—Found: Cl ion; 11.07%. Calc.: Cl ion, 11.05%.

(86) X=p.CH$_3$OC$_6$H$_4$—;

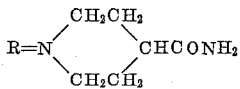

M.P. 160° C.; M.P. hydrochl., 178–9° C.; C$_{18}$H$_{24}$N$_4$O$_3$—Found: N, 16.12%. Calc.: N, 16.27%.

(87) X=p.CH$_3$OC$_6$H$_4$—; R=N(CH$_3$)$_2$; B.P.$_{0.4}$ 160° C.; M.P. hydrochl., 217° C.; C$_{14}$H$_{20}$ClN$_3$O$_2$ (hydrochl.)—Found: Cl ion, 12.11%. Calc.: Cl ion, 11.91%.

(88) X=p.CH$_3$OC$_6$H$_4$—;

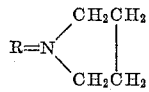

B.P.$_{0.7}$ 188° C.; M.P. hydrochl., 169° C.; C$_{16}$H$_{22}$ClN$_3$O$_2$ (hydrochl.)—Found: Cl ion, 10.91%. Calc.: Cl ion, 10.95%.

(89) X=3.4.5(CH$_3$O)$_3$C$_6$H$_2$—;

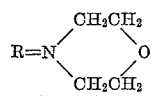

B.P.$_{0.3}$ 218° C.; M.P. hydrochl., 186–7° C.; C$_{18}$H$_{26}$ClN$_3$O$_5$ (hydrochl.)—Found: Cl ion, 8.69%. Calc.: Cl ion, 8.80%.

(90) X=αC$_{10}$H$_7$—;

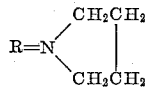

M.P. hydrochl., 116–7° C.; C$_{13}$H$_{22}$ClN$_3$O (hydrochl.)—Found: Cl ion, 10.28%. Calc.: Cl ion, 10.31%.

(91) X=C$_6$H$_5$—C$_6$H$_4$— (p. biphenylyl); R=N(CH$_3$)$_2$, M.P. hydrochl., 209–10° C.; C$_{19}$H$_{22}$ClN$_3$O (hydrochl.)—Found: Cl ion, 10.25%. Calc.: Cl. ion, 10.31%.

(92) X=C$_6$H$_5$—C$_6$H$_4$—;

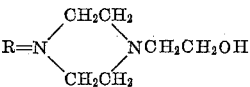

M.P. dihydrochl., 258° C.; C$_{23}$H$_{30}$Cl$_2$N$_4$O$_2$ (dihydrochl.)—Found: Cl ion, 15.36%. Calc.: Cl ion, 15.24%.

*General Formula D*

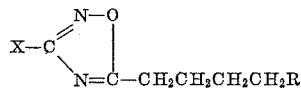

(93) X=C$_6$H$_5$—; R=N(C$_2$H$_5$)$_2$, B.P.$_{0.4}$ 145° C.; M.P. hydrochl., 117–8° C.; C$_{16}$H$_{24}$ClN$_3$O (hydrochl.)—Found: Cl ion, 11.56%. Calc.: Cl ion, 11.44%.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A process for producing new 1,2,4-oxadiazoles of the formula

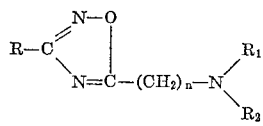

wherein:
R is a member selected from the group consisting of phenyl, halogenophenyl, nitrophenyl, hydroxyphenyl, alkylphenyl, alkoxyphenyl, phenylalkyl, naphthyl, tetrahydronaphthyl, biphenylyl, and pyridyl; said alkyl and alkoxy moieties being of from 1 to 4 carbon atoms;
$n$ = an integer from 1 to 4;
$R_1$ and $R_2$ are each members selected from the group consisting of hydrogen, alkyl of from 1 to 4 carbon atoms and benzyl; and
$R_1$ and $R_2$ taken collectively with the nitrogen atom to which they are joined form a heterocyclic ring selected from the group consisting of N-pyrrolidinyl, N-piperidinyl, N-morpholinyl, N'-methyl-N-piperazinyl, N'-($\beta$-hydroxy-ethyl) - N - piperazinyl and 4-carbamyl-N-piperidinyl, which comprises the steps of condensing in an inert solvent and at a temperature of about 50–140° C. an amidoxime derivative represented by the general formula

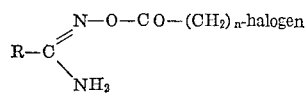

wherein R and $n$ are as aforesaid, with an amine represented by the general formula

wherein $R_1$ and $R_2$ are as aforesaid.

2. A process for producing new 1,2,4-oxadiazoles of the formula

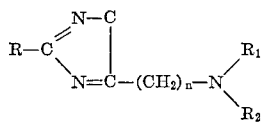

wherein:
R is a member selected from the group consisting of phenyl, halogenophenyl, nitrophenyl, hydroxyphenyl, alkylphenyl, alkoxyphenyl, phenylakyl, naphthyl, tetrahydronaphthyl, biphenylyl and pyridyl; each of said alkyl and alkoxy moieties is of from 1 to 4 carbon atoms;
$n$ is an integer from 1 to 4;
$R_1$ and $R_2$ are each members selected from the group consisting of hydrogen, alkyl of from 1 to 4 carbon atoms and benzyl; and
$R_1$ and $R_2$ taken collectively with the nitrogen atom to which they are joined form a heterocyclic ring selected from the group consisting of N-pyrrolidinyl, N-piperidinyl, N-morpholinyl, N'-methyl-N-piperazinyl, N'-($\beta$-hydroxy - ethyl) - N - piperazinyl and 4-carbamyl-N-piperidinyl, which comprises the steps of heating an amidoxime derivative represented by the general formula

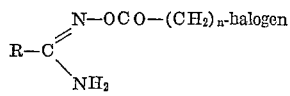

wherein R and $n$ have the above mentioned signification, to yield the corresponding oxadiazole represented by the formula

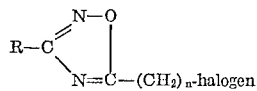

and reacting said oxadiazole, at a temperature of from about 80–140° C., with an amine of the general formula

wherein $R_1$ and $R_2$ are as aforesaid, to obtain the desired compound.

3. A process for producing 1,2,4-oxadiazoles having the general formula

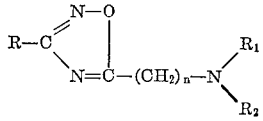

wherein:
R is a member selected from the group consisting of phenyl, halogenophenyl, nitrophenyl, hydroxyphenyl, alkylphenyl, alkoxyphenyl, phenylalkyl, naphthyl, tetrahydronaphthyl, biphenylyl and pyridyl; each of said alkyl and alkoxy moieties being of from 1 to 4 carbon atoms;
$n$ is an integer from 1 to 4;
$R_1$ and $R_2$ are each members selected from the group consisting of hydrogen, alkyl of from 1 to 4 carbon atoms and benzyl; and
$R_1$ and $R_2$ taken collectively with the nitrogen atom to which they are joined form a heterocyclic ring selected from the group consisting of N-pyrrolidinyl, N-piperidinyl, N-morpholinyl, N'-methyl-N-piperazinyl, N'-($\beta$-hydroxy-ethyl) - N - piperazinyl, and 4-carbamyl-N-piperidinyl, which comprises reacting, at a temperature of from about 50–140° C., an amidoxime represented by the general formula

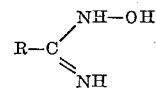

wherein R is as aforesaid, with a compound selected from the group represented by the general formula

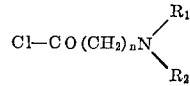

wherein $R_1$ and $R_2$ and $n$ are as aforesaid, and hydrohalides thereof and recovering the resulting compound.

4. A compound selected from the group consisting of 1,2,4-oxadiazoles of the formula

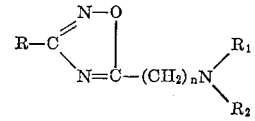

wherein:
R is a member selected from the group consisting of phenyl, halogenophenyl, nitrophenyl, hydroxyphenyl, alkylphenyl, alkoxyphenyl, phenylalkyl, naphthyl, tetrahydronaphthyl, biphenylyl, and pyridyl; each of said alkyl and alkoxy moieties being of from 1 to 4 carbon atoms;
$n$ is an integer from 1 to 4;
$R_1$ and $R_2$ are each members selected from the group consisting of hydrogen, alkyl of from 1 to 4 carbon atoms and benzyl;
$R_1$ and $R_2$ taken collectively with the nitrogen atom to which they are joined forming a heterocyclic ring selected from the group consisting of N-pyrrolidinyl, N-piperidinyl, N-morpholinyl, N-piperazinyl and 4-carbamyl-N-piperidinyl, and non-toxic acid addition salts thereof.

5. A compound of the formula

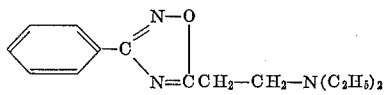

6. A compound of the formula

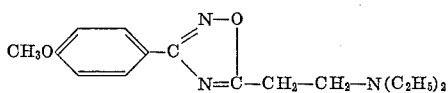

7. A compound of the formula

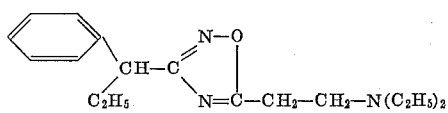

8. A compound of the formula:

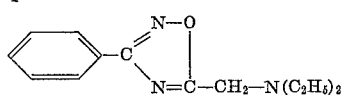

9. A compound of the formula:

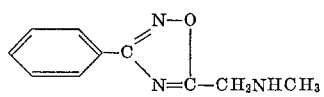

10. A compound of the formula:

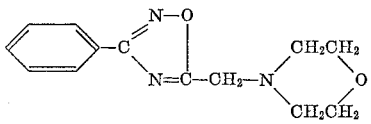

References Cited in the file of this patent

UNITED STATES PATENTS 2,648,669     Roemer et al. _____ Aug. 11, 1953

FOREIGN PATENTS 626,470     Great Britain _____ July 15, 1949

OTHER REFERENCES

Bergman: The Chemistry of Acetylene and Related Compounds, page 80, Interscience Publishers Inc., New York, 1948.